June 4, 1929.  L. J. PEARSON  1,716,320
STORAGE BATTERY PLATE AND PROCESS OF MAKING SAME
Filed May 22, 1920
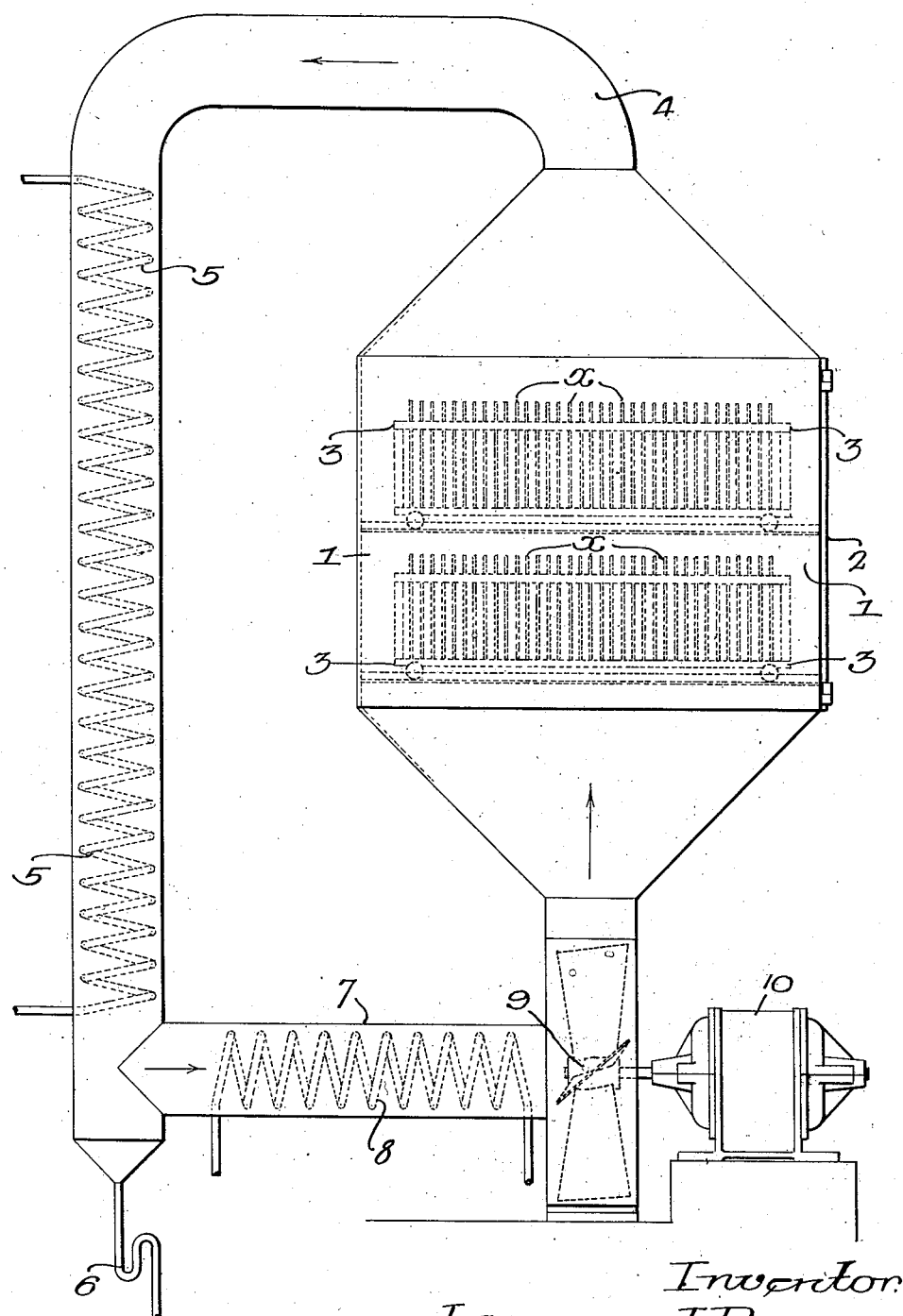
Inventor.
Lawrence J. Pearson.
by his Attorneys.
Howson & Howson Patented June 4, 1929.

1,716,320

UNITED STATES PATENT OFFICE.

LAWRENCE J. PEARSON, OF WYNCOTE, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

STORAGE-BATTERY PLATE AND PROCESS OF MAKING SAME.

Application filed May 22, 1920. Serial No. 383,458.

One object of my invention is to provide a negative storage battery plate which shall have its active material in such condition as to render unnecessary the relatively long initial charge ordinarily required for the purpose of reducing said active material to its active state, when the battery of which said plate forms a part is to be put into service; a further object being to provide such plate with active material of sufficient hardness and coherence to prevent breakage or other injury in handling and shipping.

A further object of the invention is to simplify and reduce the cost of the process of preparing negative storage battery plates to bring them into the condition above indicated.

In carrying out my process the fully formed and charged negative storage battery plates, containing a certain amount of sulphuric acid solution, are taken direct from the tanks in which they are formed and, after first pressing or rolling if necessary, are placed in a closed chamber containing a limited volume of air. This air is put in motion and after being heated is delivered to the plates so as to dry them. The moisture absorbed by the air is then removed by cooling and condensation.

In the above operation the limited amount of oxygen of the air in the closed chamber reacts with the finely divided active material of the plates to form limited amounts of litharge or other oxide or hydrated oxide of lead,—mainly on and adjacent the surfaces of the plates. This oxide then reacts with the sulphuric acid present in the pores of the plates to form lead sulphate which imparts to the surface portions of the active material of said plates the mechanical strength desired to permit them to be handled and shipped without injury, while at the same time leaving the main body of active material in the metallic or fully charged state. When it is desired to place in service the negative plates thus prepared, but a relatively short charge is necessary to reduce the oxidized and sulphated surface to its active, metallic condition.

The extraction of oxygen from the air within the closed system or chamber in which the plates are treated tends to reduce the pressure within the system below that of the surrounding air so that additional air enters through the cracks and joints, carrying oxygen, as does all air, to the extent of about one-fifth its volume. This added oxygen is also absorbed in whole or in part by the active material of the plates. For each volume of oxygen extracted or absorbed by the plates approximately four volumes of nitrogen are left in the system, so that as the treatment proceeds, the system becomes filled almost completely with nitrogen which is inert with respect to the active material of the plates and which can therefore be heated, circulated, and cooled to dry the plates without producing further changes in the active material. For the purpose of carrying out the above described process I provide apparatus such as that indicated diagrammatically in the drawings herewith, in which, The figure is a diagrammatic elevation of a system of apparatus which may be employed.

In the above drawing, 1 represents a closed chamber having a door 2 through which the racks or carriers 3 for the plates $x$ may be introduced. Leading from the top of the chamber 1 is a conduit 4 having a downwardly extending portion in which is mounted a condensing pipe 5 through which is circulated a suitable cooling medium such as cold water, brine or ammonia.

The lower end of this portion of the conduit 4 has preferably connected to it a trap or drip pipe 6 designed to automatically discharge from the system the liquid condensed from the circulating gas by the cooling coil 5, and there is also connected to said lower portion of the vertical section of conduit, a conduit or chamber 7 containing a heating coil 8 to which steam or other heating medium is supplied from a suitable source. A casing containing a fan or blower 9 is connected to the delivery end of the heating chamber 7 and is designed to discharge into the lower part of the chamber 1, the fan being operated by an electric or other motor 10.

After the plates to be treated and dried have been introduced into the chamber 1, the door 2 is closed and the fan 9 put in operation so that the air or gas within said chamber is thereupon circulated through the system in the direction of the arrows. The circulating gas coming in contact with the cold pipe 5 is cooled to a temperature at which a large part of its contained moisture is condensed to the liquid form and discharged through the trap 6. The dried gas continuing the circulation, is then heated by the coil 8 and passes through the fan to the chamber 1 where, as above described, all or a portion of its contained oxygen reacts with the spongy lead of the plates to form lead oxide, which in turn reacts with the sulphuric acid contained in the pores of the plates to give them a superficial coating of lead sulphate, while at the same time the warm dry gas absorbs moisture from the plates. The gas thus leaving the chamber 1, with the moisture absorbed from the plates therein, passes into the conduit 4 where the absorbed moisture is condensed or abstracted, and after said gas is again heated by the coil 8 it is caused to act upon and further dry the plates in the racks or holders 3 in the chamber 1, and this cycle of operation is continued repeatedly. When the moisture has thus been completely removed from the plates, the portions of the active material remaining in the charged, metallic state will not react with the oxygen of the air at ordinary temperatures, and the plates may be taken out of the casing and handled, stored and conveniently transported without serious danger of injury or of further oxidation,— since the limited amount of lead sulphate formed as described gives them the necessary structural strength, while the absence of moisture prevents oxidation of the metallic portions.

It will be seen that the results of the process are subject to complete control since the desired amount of oxidation of the active material may be determined by the correct adjustment of the volume of air in the system in relation to the number and size of the plates to be treated, while the degree of sulphation of the oxide so formed will depend upon the strength of the sulphuric acid solution in the plates at the time of removal from the forming tanks. Where it is desired to sulphate the plates to a greater extent than is practicable by increasing the strength of the acid carried in the pores of the plates, a partial electrical discharge may be given to form the desired additional amount of lead sulphate before removing the plates from the forming tanks, after which they are subjected to the above described treatment.

As above indicated, an important advantage of the process resides in the fact that the plates so prepared may be restored to the fully charged condition with but a short initial charge so that not only time but current is saved.

I claim:—

1. The process which consists in circulating a predetermined volume of air over negative storage battery plates containing metallic lead and sulphuric acid; drying said air; and thereafter heating it prior to again causing it to act on said negative plates.

2. The process which consists in causing the oxygen of a predetermined volume of air to react with the active material of negative storage battery plates, containing metallic lead and sulphuric acid; and repeatedly causing the remaining gases of the air, depleted of oxygen, to be dried, heated and circulated over said plates.

3. The process which consists in heating a predetermined volume of air; causing said heated air to act on negative storage battery plates containing metallic lead and sulphuric acid to remove the water therefrom and cause a superficial layer of sulphated oxide of lead to be formed; repeatedly removing the water from the remaining gases of the air; heating said gases and repeatedly causing them to act on the plates.

4. The process which consists in partially discharging fully charged negative storage battery plates; and thereafter treating said plates out of electrolytic solution to form upon them a coating of sulphated oxide of lead.

5. The process which consists in preparing a charged negative storage battery plate containing metallic lead and sulphuric acid; and subjecting the surface of said plate to the action of limited amounts of oxygen to form upon it a coating of sulphated oxide of lead.

6. The process which consists in preparing a charged negative storage battery plate containing metallic lead and sulphuric acid; and subjecting said plate to the action of an inert, relatively dry gas in the presence of limited amounts of oxygen to dry the plate and form thereon a coating of sulphated oxide of lead.

LAWRENCE J. PEARSON.